United States Patent
Lin

(10) Patent No.: US 8,540,919 B2
(45) Date of Patent: Sep. 24, 2013

(54) MANUFACTURING METHOD OF HOUSING OF ELECTRONIC DEVICE

(75) Inventor: Shu-Chen Lin, Taoyuan (TW)

(73) Assignee: Quanta Computer Inc., Taoyuan Shien (TW)

( * ) Notice: Subject to any disclaimer, the term of this patent is extended or adjusted under 35 U.S.C. 154(b) by 339 days.

(21) Appl. No.: 13/064,111

(22) Filed: Mar. 7, 2011

(65) Prior Publication Data

US 2012/0061879 A1 Mar. 15, 2012

(30) Foreign Application Priority Data

Sep. 15, 2010 (TW) .............................. 99131259 A

(51) Int. Cl.
*B29C 45/14* (2006.01)
*B06B 1/02* (2006.01)

(52) U.S. Cl.
USPC ...... 264/279; 264/272.15; 264/319; 425/503; 425/504; 428/137

(58) Field of Classification Search
USPC .............. 264/275, 279, 315, 272.15; 174/50, 174/520; 428/137; 425/110, 503–504
See application file for complete search history.

(56) References Cited

U.S. PATENT DOCUMENTS

| 5,243,130 | A | * | 9/1993 | Kitagawa ........................ 174/50 |
| 5,861,577 | A | * | 1/1999 | Tamura et al. ............. 174/50.56 |
| 6,132,669 | A | * | 10/2000 | Valyi et al. .................... 264/510 |
| 7,914,898 | B2 | * | 3/2011 | Yoshikawa et al. ........... 428/457 |
| 7,989,696 | B2 | * | 8/2011 | Shi et al. ........................ 174/50 |
| 8,236,405 | B2 | * | 8/2012 | Ren .............................. 428/137 |
| 2005/0145123 | A1 | * | 7/2005 | Yoshikawa et al. ...... 101/128.21 |
| 2007/0193199 | A1 | * | 8/2007 | Carlson et al. ............... 52/729.1 |
| 2008/0127479 | A1 | * | 6/2008 | Naritomi et al. ............. 29/527.4 |
| 2010/0270052 | A1 | * | 10/2010 | Crohas et al. .................. 174/50 |
| 2012/0241185 | A1 | * | 9/2012 | Hsu et al. ........................ 174/50 |

* cited by examiner

*Primary Examiner* — Joseph S Del Sole
*Assistant Examiner* — Nahida Sultana
(74) *Attorney, Agent, or Firm* — Rabin & Berdo, P.C.

(57) ABSTRACT

A manufacturing method of housing of electronic device comprises following steps: providing a metal member; forming a plurality of micro anchored apertures on a surface of the metal member; placing the metal member in a plastic injection mold, wherein the plastic injection mold is set at a first temperature; and providing a molten plastic material in the plastic injection mold for integrating with the surface of the metal member with an injection molding manner, wherein the plastic injection mold is set at a second temperature, and the second temperature is higher than the first temperature.

10 Claims, 6 Drawing Sheets

MANUFACTURING METHOD OF HOUSING OF ELECTRONIC DEVICE

RELATED APPLICATIONS

This application claims priorities to Taiwan Application Serial Number 099131259, filed on Sep. 15, 2010, which is herein incorporated by reference.

BACKGROUND

1. Technical Field

The present invention relates to a manufacturing method of a housing, more particular to a manufacturing method of a housing of electronic device.

2. Description of Related Art

At present, methods for combining a metal member and a plastic member together as the housing of electronic device mainly are structural screwing methods, plastic structure molten methods, adhesive applying methods and methods of embedding metal member for injection molding.

For a conventional method of embedding metal member for injection molding, because the mold has to be kept in a high temperature state, the circle time of plastic member formation may be overly long and the deformation degree of final products is difficult to control.

SUMMARY

For overcoming the mentioned issues, the present invention has replaced the conventional adhering technology with a novel method of integrally forming a metal member and a plastic member with an injection molding method, after the metal member and the plastic member are processed with treatments. As such, the contact area between the metal member and the plastic member is increased and a stronger structural strength is provided, so the size of final product can be made to be smaller, thinner and lighter, and the manufacturing method is also simplified.

The present invention discloses a housing of electronic device and a manufacturing method thereof, for providing a combination manner for a metal member and a plastic member together as the housing of electronic device.

The present invention discloses a housing of electronic device and a manufacturing method thereof, wherein through rapidly controlling the mold temperature, the circle time of plastic member formation and the deformation degree of final product are reduced, and in an operation of placing the metal member in a mold, the operator can be prevented from burn or injury by the high-temperature mold.

The manufacturing method of a housing of electronic device according to the present invention comprises steps of providing a metal member; forming a plurality of micro anchored apertures on a surface of the metal member; placing the metal member in a plastic injection mold, in which the plastic injection mold is set at a first temperature; and providing a molten plastic material in the plastic injection mold for being combined on the surface of the metal member having the micro anchored apertures, in which the plastic injection mold is kept at a second temperature, and the second temperature is higher than the first temperature.

In one embodiment according to the present invention, in the step of placing the metal member in the plastic injection mold, further includes a step of placing the metal member in a mold cavity of the plastic injection mold with a vacuum suction manner. In this embodiment, a suction disc device is further installed in the mold cavity for sucking the metal member.

In another embodiment according to the present invention, a step between the step of placing the metal member in the plastic injection mold and the step of providing the molten plastic material in the plastic injection mold, further includes closing the plastic injection mold and raising the temperature of the plastic injection mold to a second temperature.

In one another embodiment according to the present invention, after the step of providing the molten plastic material in the plastic injection mold, further includes steps of cooling the plastic material to drop the temperature to the first temperature, so as to form a plastic member on the metal member; opening the plastic injection mold and processing a mold removing operation for obtaining a housing with the metal member.

In still one another embodiment according to the present invention, the step of providing the metal member further includes a step of processing a pre-treatment to the metal member. In this embodiment, the pre-treatment includes following steps of immersing the metal member in a Pyruvic acid ($CH_3COCOOH$) solution; processing a first ultrasonic cleaning with purified water to the metal member after being immerged in the Pyruvic acid solution; immersing the metal member after being cleaned by ultrasonic in a Potassium Hydroxide (KOH) solution; processing an electrolytic polishing treatment to the metal member; and processing a second ultrasonic cleaning to the metal member.

In still one another embodiment according to the present invention, the mentioned first temperature can be set between 45-65 Celsius degree; the second temperature can be set higher or equal to 140 Celsius degree.

As such, through controlling the temperature of the plastic injection mold, the combination force and formation quality are enhanced, and the circle time of plastic member formation is shortened, and the combination force and the quality control of final products can be improved; moreover, the operator is also prevented from being burned or injured by the high temperature of the mold while he/she is placing the metal member into the mold, so a safer working environment is provided.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
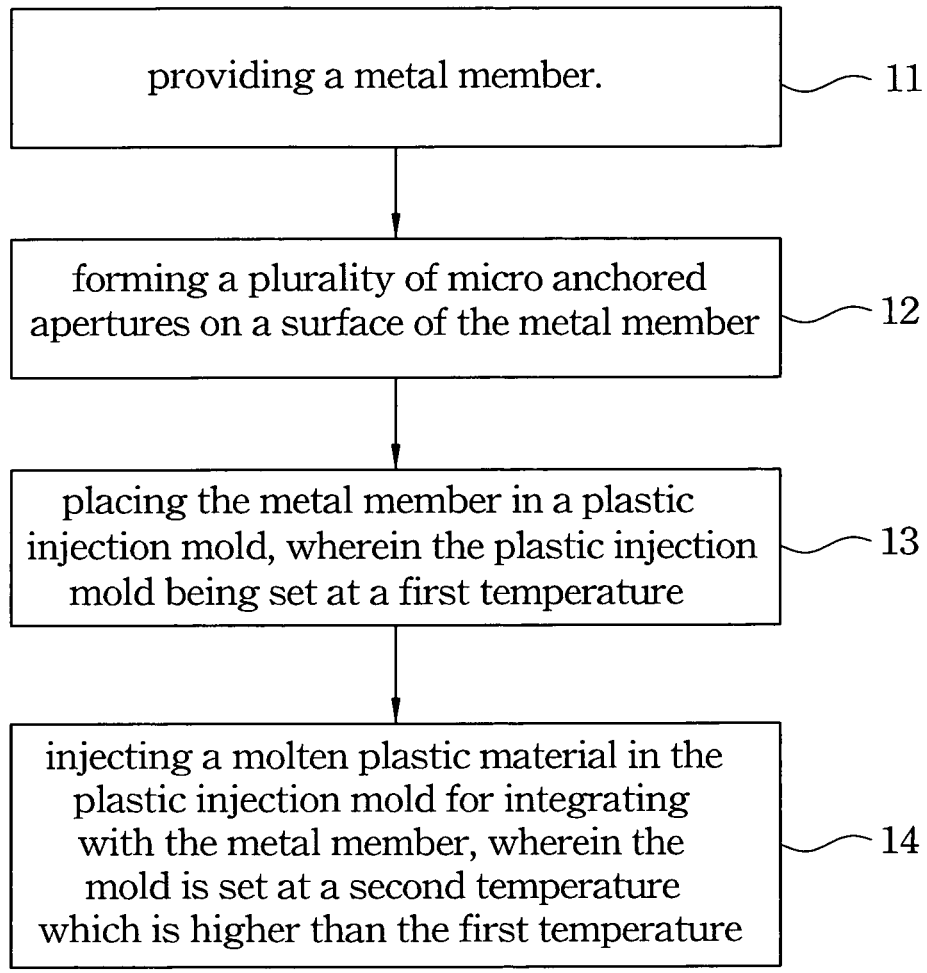
FIG. 1 is an initial flowchart showing the manufacturing method of for a housing of electronic device according to one embodiment of the present invention.

Referring to FIG. 1, which is a flowchart showing the manufacturing method of a housing of electronic device according to one embodiment of the present invention.

The manufacturing method of a housing of electronic device according to the present invention comprises the followings steps:

Step (11): providing a metal member.

Step (12): forming a plurality of micro anchored apertures on a surface of the metal member.

Step (13): placing the metal member in a plastic injection mold, wherein the plastic injection mold is set at a first temperature.

Step (14): injecting a molten plastic material into the plastic injection mold for integrating with the metal member on the surface thereof where the micro anchored apertures are formed, wherein the plastic injection mold is set at a second temperature, and the second temperature is higher than the first temperature.

Figure 2A:
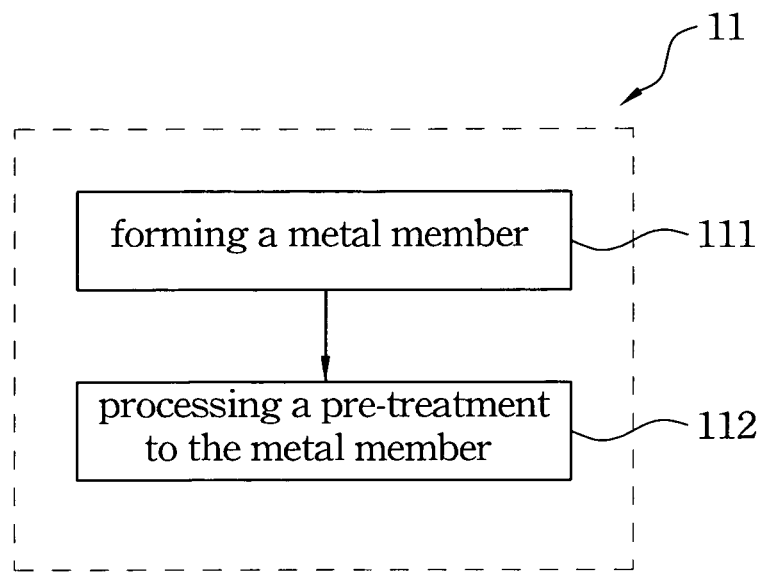
FIG. 2A is a detailed flowchart showing the manufacturing method of for a housing of electronic device performing the step (11) shown in FIG. 1, according to the present invention.
Figure 2B:
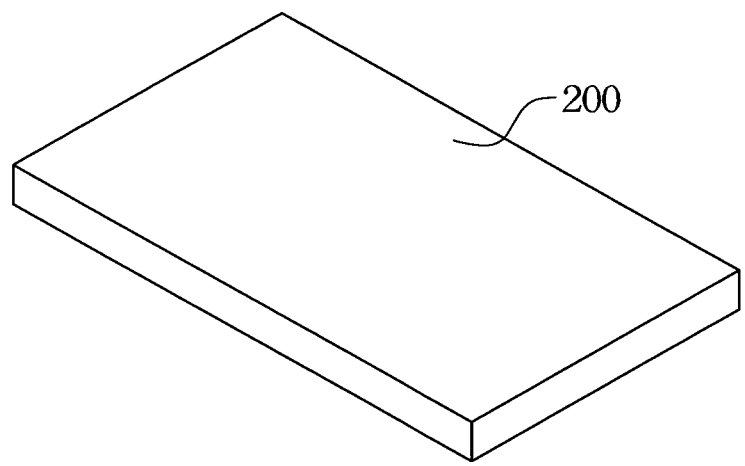
FIG. 2B is a schematic view showing the metal member of the manufacturing method of for a housing of electronic device after processed with the step (11) of FIG. 1.

Referring to FIG. 2A and FIG. 2B, wherein FIG. 2A is a detailed flowchart showing the manufacturing method of a housing of electronic device performing the step (11) shown in FIG. 1, according to the present invention; FIG. 2B is a schematic view showing the metal member of the manufacturing method of a housing of electronic device after processed with the step (11) shown in FIG. 1.

According to one embodiment of the present invention, the step (11) includes further detailed steps:

Step (111): forming a metal member 200 through a metal processing manner such as casting, extruding or forging. The material of the metal member 200 can be aluminum, titanium or an alloy of aluminum and titanium.

Step (112): processing a pre-treatment to the metal member 200, the pre-treatment for example has steps of (1) the metal member 200 being immersed in a Pyruvic acid ($CH_3COCOOH$) solution; (2) processing a first ultrasonic cleaning with purified water to the metal member 200 after being immerged in the Pyruvic acid solution; (3) immersing the metal member 200 after being cleaned by ultrasonic in a Potassium Hydroxide (KOH) solution; (4) processing an electrolytic polishing treatment to the metal member 200; and (5) processing a second ultrasonic cleaning to the metal member 200.

Figure 3A:
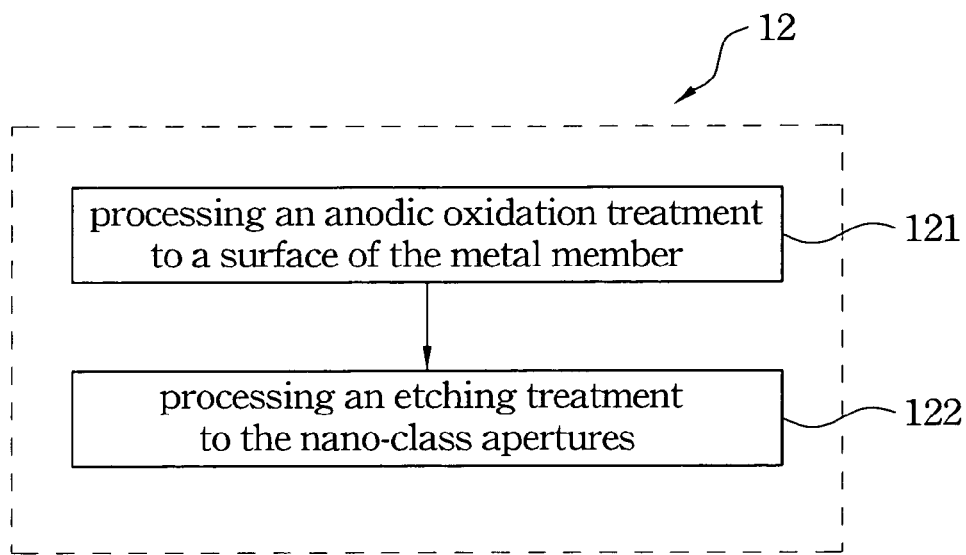
FIG. 3A is a detailed flowchart showing the manufacturing method of for a housing of electronic device performing the step (12) of FIG. 1, according to the present invention.
Figure 3B:
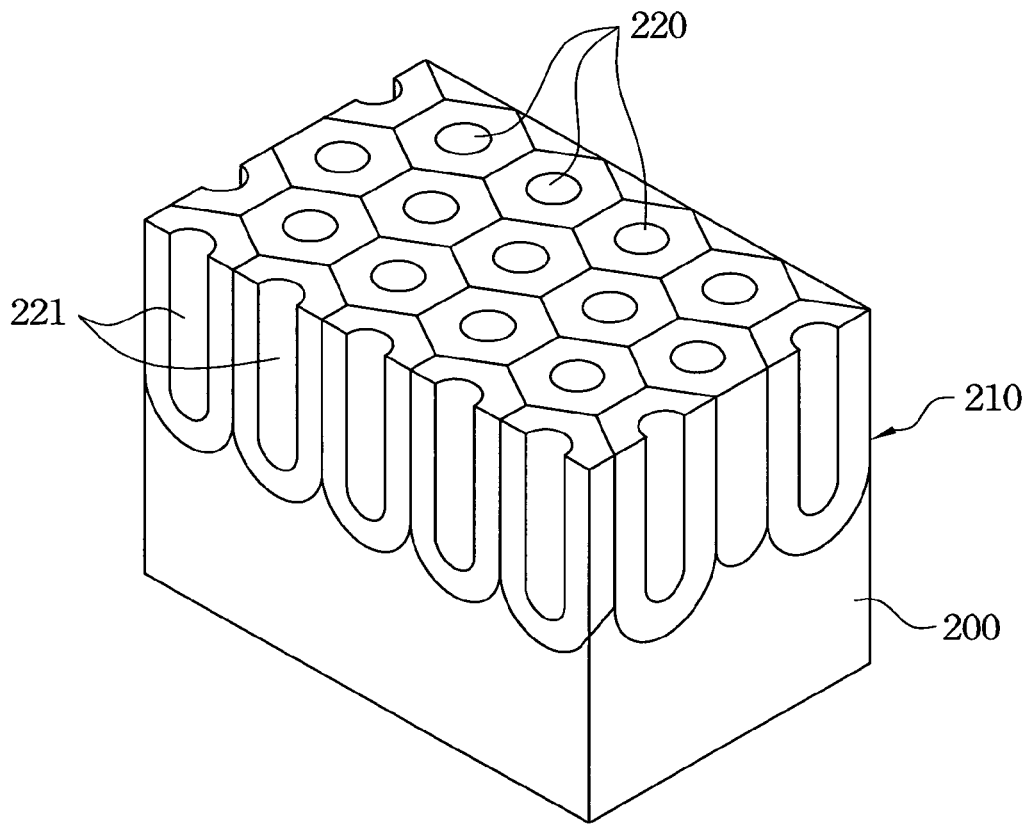
FIG. 3B is a schematic view showing the metal member of the manufacturing method of for a housing of electronic device after being processed with the step (121) of FIG. 3A.
Figure 3C:
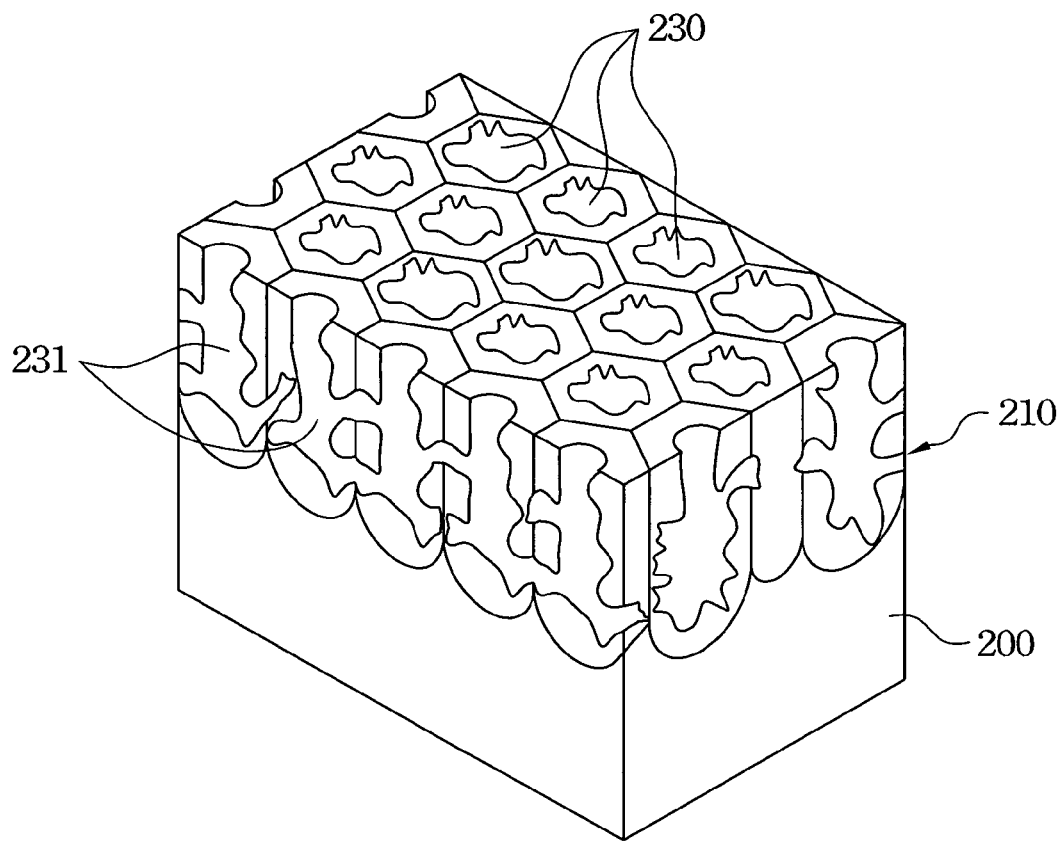
FIG. 3C is a schematic view showing the metal member of the manufacturing method of for a housing of electronic device after being processed with the step (122) of FIG. 3A.

Referring to FIG. 3A, FIG. 3B and FIG. 3C; wherein FIG. 3A is a detailed flowchart showing the manufacturing method of a housing of electronic device performing the step (12) shown in FIG. 1, according to the present invention; FIG. 3B is a schematic view showing the metal member of the manufacturing method of a housing of electronic device after being processed with the step (121) of FIG. 3A; FIG. 3C is a schematic view showing the metal member of the manufacturing method of a housing of electronic device after being processed with the step (122) of FIG. 3A.

In one embodiment according to the present invention, the mentioned step (12) further includes detailed steps as followings:

Step (121): processing an anodic oxidation treatment to a surface of the metal member 200 (as shown in FIG. 3B); in this step, when an acid solution is utilized to process the anodic oxidation treatment to the surface of the metal member 200, an oxidized film 210 is formed on the surface of the metal member 200; the oxidized film 210 fully covers the surface of the metal member 200 and is uniformly arranged with an aperture array; because the diameter (e.g. 40-50 nm) of the arranged aperture array is qualified to be categorized as a nano meter class, these apertures at this stage are defined as nano-class apertures 220. Moreover, each nano-class aperture 220 has a flat and straight inner wall 221. What shall be addressed is that the nano-class apertures 220 do not penetrate the oxidized film 210.

In one embodiment according to the present invention, when the surface of the metal member 200 is processed with the anodic oxidization treatment, an acid solution, such as Oxalic acid ($C_2H_2O_4$) or sulfuric acid ($H_2SO_4$), is provided for being in contact and acting on the surface of the metal member 200, so an oxidized film 210 is formed on the surface of the metal member 200.

In one embodiment, the process of anodic oxidation treatment could be performed to place the metal member 200 at anode electrode side of an electrolytic cell containing the mentioned acid solution and. Moreover, the electrolytic cell is regulated to a certain stable temperature, then the anodic oxidization treatment can be performed; after the treatment is finished and the metal member 200 is removed, residual anodic oxidization solution remained on each surface of the metal member 200 can be rinsed by deionized water.

In one embodiment, the mentioned acid solution can be provided for being in contact and acting on the partial surface of the metal member 200, such that the metal member 200 can be partially processed with the anodic oxidization treatment.

Step (122): processing an etching treatment to the nano-class apertures 220 of the metal member 200 (as shown in FIG. 3B and FIG. 3C).

In this step, a chemical solution is provided to be in contact with the surface of the metal member 200 having the nano-class apertures 220, so the chemical solution can permeate and etch the nano-class apertures 220, so as to enlarge each size of the nano-class apertures 220. Preferably, the diameter of the nano-class is expanded to a size defined as a micro meter class, which at this stage can be defined as micro anchored apertures 230.

In one embodiment according to the present invention, when the step (122) is processed, a chemical solution such as phosphoric acid or sulfuric acid is provided for acting on the surface of the metal member 200 having the nano-class apertures 220, so the chemical solution etches the nano-class apertures 200, and the size of each nano-class aperture 220 is enlarged and the inner walls 221 of each nano-class aperture 220 are roughen.

In details, the action of enlarging the size of nano-class aperture 220 includes deepening the depth of each nano-class aperture 220 and expanding the diameter (or width) of each nano-class aperture 220, and the depth and diameter of each nano-class aperture 220 are different with those of other nano-class aperture 220. Moreover, through etching by the chemical solution, each inner wall 231 of the micro anchored apertures 230 is formed in an irregular dendritic shape, and a rough surface with uneven cavities or protrusions is formed. In one preferred embodiment according to the present, the diameters of the micro anchored apertures 230 are respectively in a range below 5 micrometers, or in a range below 6 micrometers.

Moreover, in this embodiment, the chemical solution also etches the inner walls 231 of the micro anchored apertures 230, such that a part of the inner walls 231 of the micro anchored apertures 230 may be communicated with neighboring micro anchored apertures 230 (as shown in FIG. 3C). As such, when the step (14) is processed, after the plastic material is filled in the micro anchored apertures 230, the plastic material in the micro anchored apertures 230 can be communicated with each other, and an anchor effect of holding the plastic material is formed, thus a strong combination force is generated, and the tension and combination forces between the plastic member 400 and the metal member 200 are increased. In the process of etching treatment, several factors shall be addressed, such as the temperature and concentration of the etching acid solution (e.g. 5% in weight and at 20 Celsius degree). The higher the temperature, the faster the etching speed; and the higher concentration of the chemical solution (i.e. the etching solution), the faster the etching speed; a strong acid solution or a strong alkaline solution can both be served to achieve the etching effect.

Figure 4A:
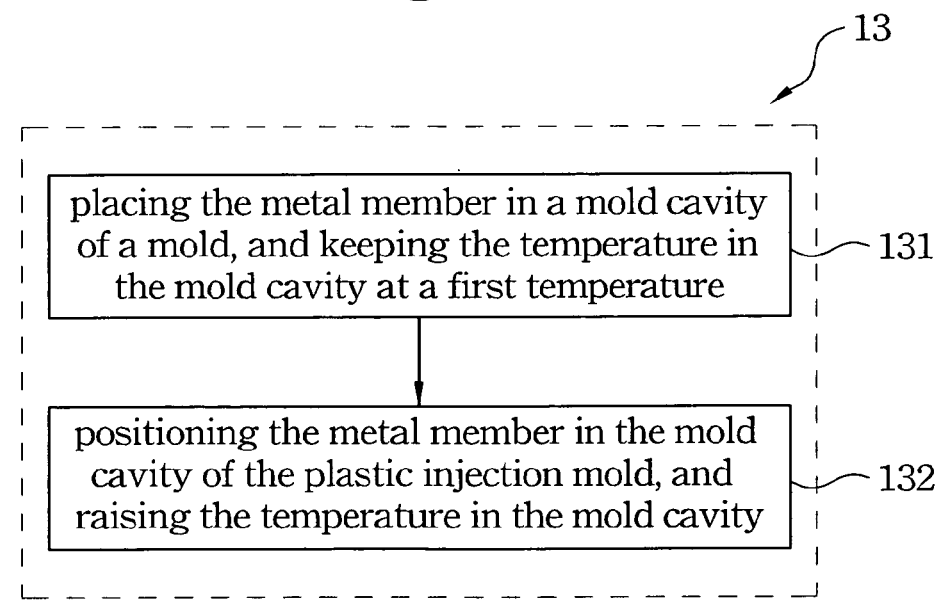
FIG. 4A is a detailed flowchart showing the manufacturing method of for a housing of electronic device performing the step (13) of FIG. 1, according to the present invention.
Figure 4B:
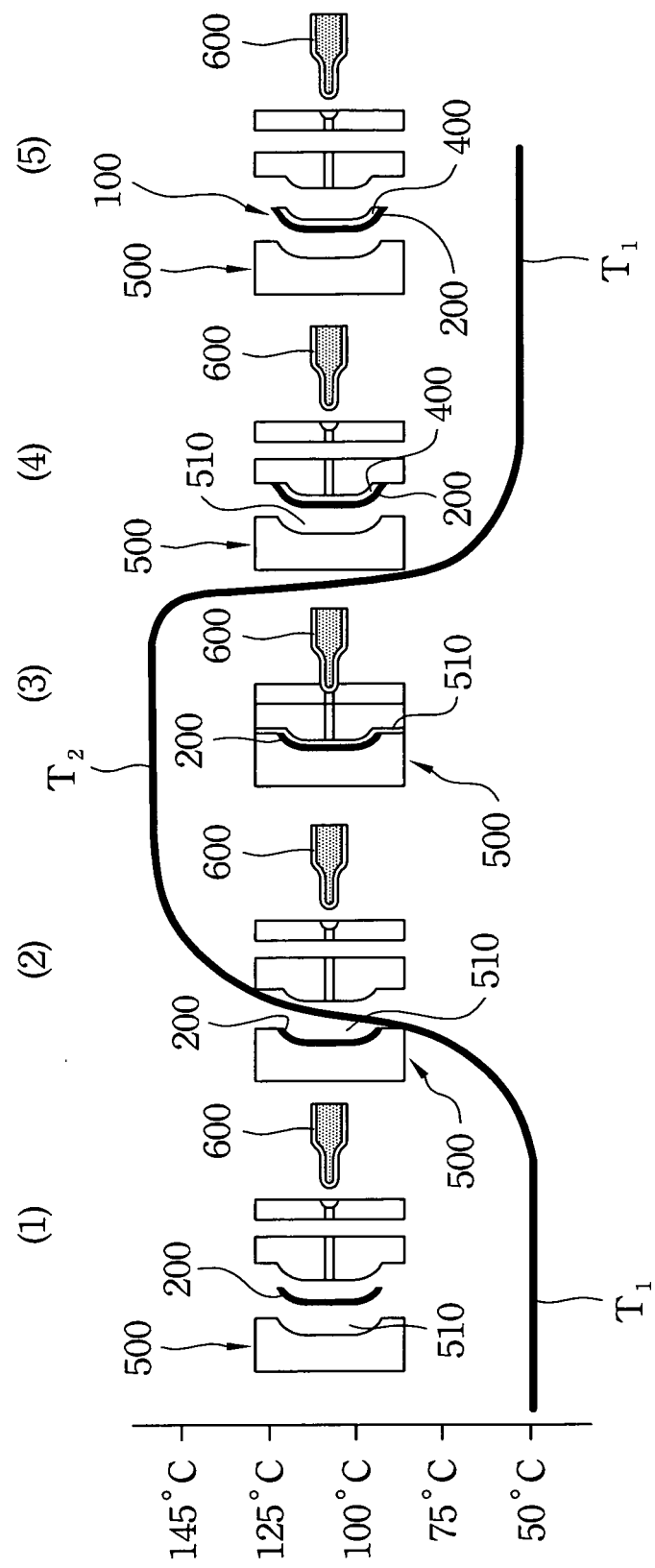
FIG. 4B is a schematic view showing the manufacturing method of a housing of electronic device in sequence performing the step (13) and the step (14) of FIG. 1, according to the present invention.

Referring to FIG. 4A and FIG. 4B; wherein the FIG. 4A is a detailed flowchart showing the manufacturing method of for a housing of electronic device performing the step (13) of FIG. 1, according to the present invention; FIG. 4B is a schematic view showing the manufacturing method of a housing of electronic device in sequence performing the step (13) and the step (14) of FIG. 1, according to the present invention.

In one embodiment according to the present invention, the step (13) further includes detailed steps as followings:

Step (131): placing the metal member 200 in a mold cavity 510 of a plastic injection mold 500, and the temperature in the mold cavity 510 is kept at a first temperature T1 (as shown in FIG. 4B (1)). For example, the first temperature T1 does not need to be too high, which can be set between 45 to 65 Celsius degrees. As such, an operator is prevented from being burned or injured when placing the metal member 200 in the high-temperature mold 500.

Step (132): positioning the metal member 200 in the mold cavity 510 of the plastic injection mold 500, and raising the temperature in the mold cavity 510 (as shown in FIG. 4B (2)). Moreover, one fashion of positioning the metal member 200 in the cavity mold 510 is to lodge the metal member 200 at a proper location through an arrangement of protruding posts. Another fashion can be positioned the metal member 200 in the mold cavity 510 of the plastic injection mold 500 with a vacuum suction manner, wherein the mentioned vacuum suction manner can be carried out through installing a suction disc device or an air sucking device in the mold cavity 510 for sucking and positioning the metal member 200.

Figure 5A:
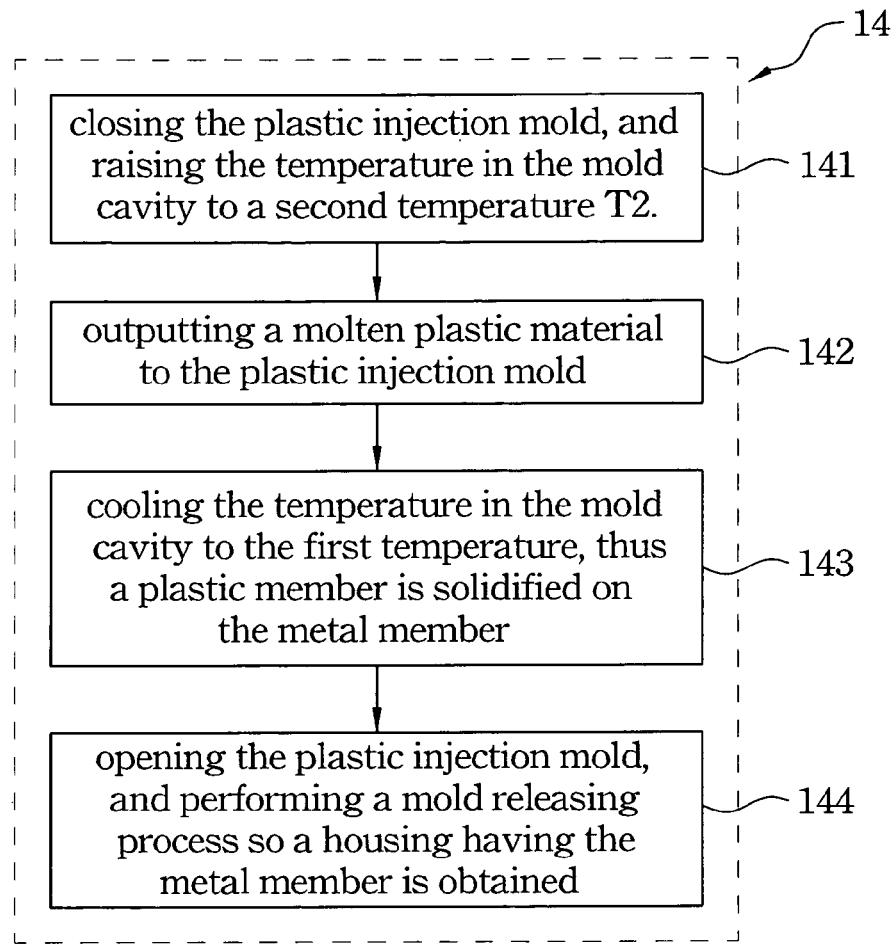
FIG. 5A is a detail flowchart showing the manufacturing method of a housing of electronic device performing the step (14) of FIG. 1, according to the present invention.

Referring to FIG. 5A and FIG. 4B, wherein FIG. 5A is a detail flowchart showing the manufacturing method of a housing of electronic device performing the step (14) of FIG. 1, according to the present invention.

In one embodiment according to the present invention, the step (14) further includes detailed steps as followings:

Step (141): closing the plastic injection mold 500, and raising the temperature in the mold cavity 510 to a second temperature T2 (as shown in FIG. 4B (3)).

Figure 5B:
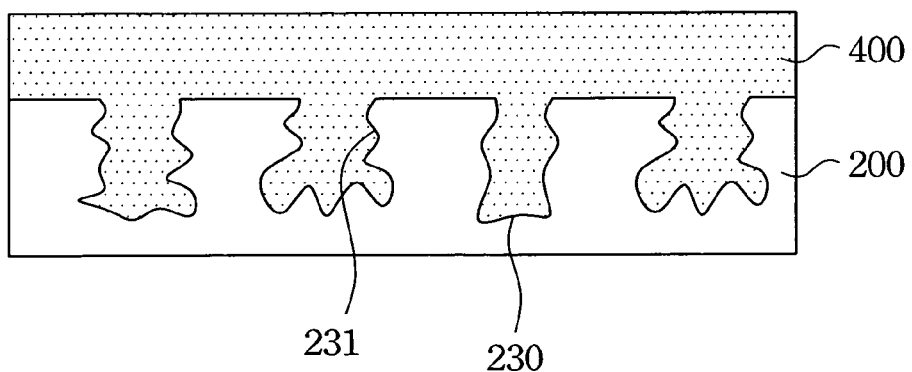
FIG. 5B is a schematic view showing the housing of electronic device after being processed with the step (142) of FIG. 5A, according to the present invention.

Step (142): actuating a plastic injection molding machine 600 (as shown in FIG. 4B (3)), so a molten plastic material is output from the plastic injection molding machine 600 to the plastic injection mold 500, then the mold cavity 510 is filled with the plastic material with an injection molding manner. As such, the molten plastic material can be integrated with the surface of the metal member 200 having the micro anchored apertures 230, and the molten plastic material can be filled in the micro anchored apertures 230. Substantially, when the molten plastic material is filled in the micro anchored apertures 230, the molten plastic material is fully abutted and adhered on the inner walls 231 of the micro anchored apertures 230. Referring to FIG. 5B, which is a schematic view showing the housing of electronic device after being processed with the step (142) of FIG. 5A. At this moment, the temperature in the mold cavity 510 of the plastic injection mold 500 is kept at the second temperature T2. For example, the second temperature T2 can be higher than 140 Celsius degree.

Step (143): cooling the plastic material to drop the temperature in the mold cavity 510 of the plastic injection mold 500 to the first temperature T1, thus a plastic member 400 is solidified on the metal member 200 (as shown in FIG. 4B (4)).

Step (144): opening the plastic injection mold 500, and performing a mold releasing process (as shown in FIG. 4B (4) (5)), so that a housing 100 having the metal member 200 is obtained, at this moment the temperature in the mold cavity 510 of the plastic injection mold 500 is still kept at about the first temperature T1.

As such, through controlling the temperature of the plastic injection mold, the combination force and formation quality are enhanced, and the circle time of plastic member formation is shortened, and the combination force and the quality control of final products can be improved; moreover, the operator is also prevented from being burned or injured by the high temperature of the mold while he/she is placing the metal member into the mold, so a safer working environment is provided.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A manufacturing method of a housing of an electronic device, comprising:
   providing a metal member;
   forming a plurality of nano-class apertures on a surface of the metal member;

enlarging each of the nano-class apertures and roughening inner walls of the nano-class apertures so that the nano-class apertures become micro-class anchored apertures, wherein inner walls of the micro-class anchored apertures are formed with uneven cavities and protrusions thereon;

placing the metal member in a plastic injection mold, wherein the plastic injection mold is set at a first temperature; and providing a molten plastic material in the plastic injection mold for being combined with the surface of the metal member having the micro-class anchored apertures, wherein the plastic material fills in the micro-class anchored apertures and fully abuts and adheres on the inner walls of the micro-class anchored apertures, and the plastic injection mold is set at a second temperature, and the second temperature is higher than the first temperature.

2. The manufacturing method of a housing of an electronic device according to claim 1, wherein the step of placing the metal member in the plastic injection mold further comprises:
placing the metal member in a mold cavity of the plastic injection mold with a vacuum suction manner.

3. The manufacturing method of a housing of an electronic device according to claim 2, wherein the step of placing the metal member in the mold cavity of the plastic injection mold with a vacuum suction manner further comprises:
providing a suction disc device in the mold cavity for sucking the metal member.

4. The manufacturing method of a housing of an electronic device according to claim 1, further comprising, between the step of placing the metal member in the plastic injection mold and the step of providing the molten plastic material in the plastic injection mold,
closing the plastic injection mold and raising the temperature to the second temperature.

5. The manufacturing method of a housing of an electronic device according to claim 1, further comprising, after the step of providing the molten plastic material in the plastic injection mold,
cooling the plastic material to drop the temperature to the first temperature; and
opening the plastic injection mold and processing a mold removing operation.

6. The manufacturing method of a housing of an electronic device according to claim 1, wherein the step of providing the metal member further comprises:
processing a (pre-treatment to the metal member.

7. The manufacturing method of a housing of an electronic device according to claim 6, wherein the step of processing a pre-treatment to the metal member further comprises the following steps:
immersing the metal member in a Pyruvic acid (CH3COCOOH) solution;
processing a first ultrasonic cleaning with purified water to the metal member after being immerged in the Pyruvic acid solution;
immersing the metal member, after being cleaned by the first ultrasonic cleaning, in a Potassium Hydroxide (KOH) solution;
processing an electrolytic polishing treatment to the metal member; and
processing a second ultrasonic cleaning to the metal member.

8. The manufacturing method of a housing of an electronic device according to claim 1, wherein each of the micro-class anchored apertures has a diameter smaller than 6 micrometers and is in an irregular shape.

9. The manufacturing method of a housing of an electronic device according to claim 1, wherein the first temperature is between 45 to 65 Celsius degrees.

10. The manufacturing method of a housing of an electronic device according to claim 1, wherein the second temperature is higher than 140 Celsius degrees.

* * * * *